United States Patent Office

3,393,239
Patented July 16, 1968

1

3,393,239
COLOR STABILIZED 4,4'-METHYLENE-BIS(2-CHLOROANILINE)
Harry Walter Wolfe, Jr., Newark, Del., assignor to E. I. du Pont de Nemours and Company, Wilmington, Del., a corporation of Delaware
No Drawing. Filed Jan. 19, 1965, Ser. No. 426,670
3 Claims. (Cl. 260—570)

ABSTRACT OF THE DISCLOSURE

Isolated 4,4'-methylenebis(2-chloroaniline) in admixture with from about 0.01% to about 1% by weight, based on the weight of said 4,4'-methylenebis(2-chloroaniline), of alkali metal hydroxide as color stabilizer.

---

4,4'-methylenebis(2-chloroaniline), hereinafter for convenience called "MOCA," is widely used as a curing agent for polyurethane prepolymers. It is customary during the preparation of vulcanizates of polyurethane prepolymers using MOCA as a curing agent to melt the MOCA and maintain it in a molten state so that it may be readily blended with the liquid prepolymer. When the MOCA is maintained in this molten state for prolonged periods, such as greater than about 3 hours, as sometimes required, it tends to discolor. The disclored MOCA, in turn, gives an undesirable dark color to the polyurethane vulcanizate. Furthermore, the vulcanizates tend to vary in color from lot to lot. This is undesirable from the point of view of the fabricator.

Numerous methods have been put forth for the stabilization of aromatic amines against discoloration during storage. Most of the proposed methods involve the addition of a stabilizing agent. Representative disclosures of such agents appear in the following U.S. Patents: 2,422,484 (aryl mercaptans), 2,422,503 (boric acid); 2,447,615 (alkylenepolyamines); 2,461,917 (triamylamine); 2,509,891 (cycloaliphatic amines); 2,512,504 (metal halides); 2,927,136 (dibutyltin oxide); 2,950,290 (an organic phosphite); and 2,971,029 (stannous halides).

The addition of the prior art stabilizing agents has the disadvantage of adding to the cost of the product. Even more serious, the presence of such stabilizing agents in the MOCA may make it unsuitable for use as a curing agent for polyurethane prepolymers.

It is the object of the present invention to provide an economical and effective agent for the stabilization of MOCA against discoloration on exposure to heat, which agent does not adversely affect the subsequent use of the MOCA as a chain-extender for polyurethane prepolymers. It is also the object to provide a new process for stabilizing MOCA against discoloration and the resultant color stabilized product. Other objects will appear hereinafter.

These and other objects of the present invention are accomplished by incorporating into MOCA a color stabilizing amount of alkali metal hydroxide. The resultant MOCA product does not discolor when melted at practical temperatures and therefore does not discolor materials, such as polyurethanes, of which it becomes a part. Furthermore, the color-stable MOCA product can be used as an agent to chain extend diisocyanato-terminated prepolymers and the like to form polyurethane products containing urea linkages.

The MOCA that is to be color stabilized is prepared by the general procedures used for the preparation of methylenedianiline. That is, a mineral acid salt of o-chloroaniline is reacted with formaldehyde at a temperature below about 50° C., and the intermediate condensation product is then heated at a temperature above about 60° C. to effect rearrangement. The reaction mass is neutralized by means of an alkali metal hydroxide or carbonate, and the aqueous and organic phases are separated. Representative disclosures of this process appear in U.S. Patents 2,818,433 and 2,974,168. Thus, the presence of alkali metal hydroxide with MOCA is old. This hydroxide is always removed however as part of the purification procedure to obtain the final product.

Separation of the MOCA from the aqueous alkaline phase is essential in order to remove water-soluble impurities which are formed during the preparation of the MOCA. These impurities are largely salts of the mineral acid which are formed upon neutralization of the reaction mass. The presence of these impurities is undesirable for various reasons. They dilute the MOCA, and are likely likely to have an adverse effect on its stability, and are detrimental to the properties of the polyurethane vulcanizates produced from the MOCA.

Thus, the MOCA that has been used in the past to cure isocyanato-terminated prepolymers and for other purposes has been practically, if not entirely, free of alkali metal hydroxide, at least to the extent that stabilization against discoloration has not been obtained. It is therefore intended in this specification and claims that the MOCA which is color stabilized in the present invention is that which has been purified as described above from which previously added alkali metal hydroxide has been removed. In short, the MOCA for which color stability is now attained is the final product, i.e., that which has been isolated from the neutralized reaction mass.

The alkali metal hydroxide may be incorporated into the MOCA at any time after the water-soluble reaction byproducts are removed. The most convenient method is to add an aqueous solution of the hydroxide to the MOCA while the latter is in a molten state. The water thus introduced is removed during the conventional drying step. Alternatively, the dry hydroxide may be added either to the molten or to the solid MOCA, provided that an intimate dispersion of the two materials is effected.

The preferred alkali metal hydroxides are sodium hydroxide and potassium hydroxide because of their low cost and ready availability. Lithium hydroxide, rubidium hydroxide, or cesium hydroxide may also be used.

The amount of the stabilizing agent to be added to the MOCA in accordance with this invention ranges from about 0.01 percent to about one percent by weight, based on the weight of the MOCA. Less than about 0.01 percent gives insufficient stabilization against discoloration and more than about one percent has an adverse effect on such properties of the final polyurethane vulcanizates as tensile strength, modulus, and compression set.

The MOCA stabilized by the method described above shows a significant improvement in color stability at temperatures up to about 140° C. However, since MOCA melts at about 110° C., there is no need to heat beyond 140° C.

The stabilized MOCA prepared in accordance with this invention may be used as a chain-extending agent by reacting about an equivalent amount thereof with any of the convenitional isocyanato-terminated polyurethane prepolymers well known in the art. Such polymers are disclosed in numerous references. For example, polyetherurethane polymers are discolsed in U.S. Patents 2,948,691 and 2,929,800. Reaction products of polyesters polyols and diisocyanates are disclosed in "Rubber Chemistry and Technology," vol. 23, pages 812–835 (1950). Other suitable isocyanato-terminated polymers will be known by those skilled in the art. Difunctional, substantially linear prepolymers which are the reaction product of a polyalkyleneether glycol and a molar excess of an aromatic diisocyanate are preferred.

Representative methods of using MOCA in the preparation of polyurethane products appear in U.S. Patents 3,108,976; 3,036,996; and 3,034,791, and in "MOCA," Development Products Report No. 2, March 1, 1957, and in Chemicals for Elastomers, Bulletin No. 3, February 1962, both published by the Elastomer Chemicals Department, E. I. du Pont de Nemours and Company.

The following are illustrative embodiments of the present invention. Parts and percents are by weight.

The MOCA used in these examples is prepared as follows: A solution is prepared containing 200 parts of water, 93 parts of 93% sulfuric acid, and 100 parts of o-chloroaniline. To this solution is added 32 lbs. of 37% formaldehyde while maintaining the temperature at about 28–32° C. The temperature is then gradually raised to 80° C. over a period of 3 hours and is maintained at 80° C. for about 4 hours. The reaction mass is then added to 30% sodium hydroxide. Sufficient caustic is used to render the mass alkaline to phenolphthalein. The mass is allowed to separate into two liquid layers, of which the lower layer is molten MOCA and the upper layer is an aqueous solution of sodium sulfate and excess sodium hydroxide. The aqeous layer is decanted and the molten MOCA is washed with hot water (96–100° C.) until the sodium hydroxide content of the wash water is less than 0.1%. The MOCA is then dried.

Example 1

20 parts of 4,4'-methylenebis(2 - chloroaniline) is melted, and to the molten mass is added 0.004 part (0.02%) of a stabilizing additive as shown in Table I. The mass is agitated frequently over a period of one hour while maintaining the temperature at 120° C. The molten mass is allowed to stand for 24 hours at 120° C. It is then compared in color with a freshly molten sample and with a control sample containing no additive which has been heated at 120° C. for 24 hours. The samples are rated for discoloration using a rating of 0 for light yellow (straw colored) and up to a rating of 10 for black. The results are shown in Table I.

TABLE I

| Sample: | Color rating |
|---|---|
| (A) NaOH added as a solid | 3 |
| (B) NaOH added as a solution in 0.196 part of water | 3 |
| (C) KOH added as a solution in 0.196 part of water | 1 |
| (D) LiOH | 3 |
| (E) Control—No additive | 10 |
| (F) Freshly molten MOCA | 1 |

Example 2

The procedure of Example 1, Sample B, is repeated using varying amounts of sodium hydroxide, as shown in the Table II.

TABLE II

| Amount of NaOH, percent (based on MOCA): | Color rating |
|---|---|
| 0 | 10 |
| 0.001 | 8 |
| 0.005 | 7 |
| 0.01 | 4 |
| 0.02 | 3 |
| 0.1 | 1 |
| 0.5 | 1 |
| 1.0 | 1 |

Example 3

A difunctional isocyanate-terminated polyurethane prepolymer is prepared by reacting one mole of polytetramethyleneether glycol having a number-average molecular weight of about 1000 with about two moles of 2,4-tolylene diisocyanate for 4 hours at about 80° C. The polymer is degassed by heating to 100° C. and placing in a vacuum desiccator for 15 minutes to one hour. The polymer is then held at 85° C. and to separate 100-part samples are added, respectively, 20-part samples of molten MOCA corresponding to samples A, E, and F of Table I. Each sample is poured into a circular mold, and the mold is placed on solid carbon dioxide ("Dry Ice"). The color ratings of the clear vulcanizates are shown in Table III.

TABLE III

| MOCA added: | Color rating |
|---|---|
| (A) Freshly molten | 1 |
| (B) Containing 0.02 percent NaOH and aged at 120° C. for 24 hours | 2 |
| (C) Containing no NaOH and aged at 120° C. for 24 hours | 10 |

As many widely different embodiments of this invention may be made without departing from the spirit and scope thereof, it is to be understood that this invention is not limited to the specific embodiments thereof except as defined in the appended claims.

What is claimed is:

1. 4,4'-methylenebis(2 - chloroaniline) in admixture with from about 0.01% to about 1% by weight, based on the weight of said 4,4'-methylenebis(2-chloroaniline), of alkali metal hydroxide as color stabilizer.

2. 4,4' - methylenebis(2 - chloroaniline) in admixture with from about 0.01% to about 1% by weight, based on the weight of said 4,4'-methylenebis(2-chloroaniline), of sodium hydroxide as color stabilizer.

3. 4,4'-methylenebis(2 - chloroaniline) in admixture with from about 0.01% to about 1% by weight, based on the weight of said 4,4'-methylenebis(2-chloroaniline), of potassium hydroxide as color stabilizer.

References Cited

UNITED STATES PATENTS 2,938,054   5/1960   Demers et al. _____ 26—570

CHARLES B. PARKER, *Primary Examiner.*

ROBERT V. HINES, *Examiner.*